United States Patent
Shimada et al.

(10) Patent No.: US 7,381,356 B2
(45) Date of Patent: Jun. 3, 2008

(54) ROTARY POWDER COMPRESSION MOLDING MACHINE

(75) Inventors: Keiji Shimada, Kyoto (JP); Kenji Harada, Kyotanabe (JP)

(73) Assignee: Kikusui Seisakusho, Ltd., Kyoto-shi, Kyoto (JP)

( * ) Notice: Subject to any disclaimer, the term of this patent is extended or adjusted under 35 U.S.C. 154(b) by 553 days.

(21) Appl. No.: 10/957,046

(22) Filed: Oct. 1, 2004

(65) Prior Publication Data

US 2005/0151292 A1    Jul. 14, 2005

(30) Foreign Application Priority Data

Oct. 2, 2003    (WO) .................. PCT/JP03/12683

(51) Int. Cl.
    *B29C 43/02*    (2006.01)
(52) U.S. Cl. .................. 264/39; 264/101; 264/109; 264/123; 425/135; 425/225; 425/226; 425/345; 425/406
(58) Field of Classification Search ................ None
    See application file for complete search history.

(56) References Cited

U.S. PATENT DOCUMENTS

| 6,676,863 B2 * | 1/2004 | Christiaens et al. .......... 264/39 |
| 6,884,054 B2 * | 4/2005 | Shimada .................. 425/107 |
| 2006/0013914 A1 * | 1/2006 | Shimada et al. ............ 425/408 |

2007/0149108 A1    6/2007    Behns et al.

FOREIGN PATENT DOCUMENTS

| JP | 42-21489 B | 10/1967 |
| JP | 43-25910 | 10/1968 |
| JP | 62-179197 | 5/1986 |
| JP | 62-109903 A | 5/1987 |
| JP | 64-027197 | 2/1989 |
| JP | 04-333398 | 11/1992 |
| JP | 06-297198 | 10/1994 |
| JP | 2003-107189 | 4/2003 |

* cited by examiner

*Primary Examiner*—Mary Lynn Theisen
(74) *Attorney, Agent, or Firm*—Konomi Takeshita

(57) ABSTRACT

An apparatus is provided for effectively preventing the scattering and the like of powder material, by maintaining a completely sealed condition, from the supply of the powdery material and the discharge of the molded articles to the cleaning of the interior. A housing 1 comprising, connected via a piping system 10, a vacuum device 11 for depressurizing said housing 1 interior; an atmosphere cut-off valve 12 installed on said piping system 10 for cutting off a piping interior atmosphere on said housing 1 side from a piping interior atmosphere on the vacuum device 11 side; a wet-down piping system 72 for wetting, within the atmosphere on the housing 1 side starting from said atmosphere cut-off valve 12, a compression molding mechanism 2 as well as powdery material stuck to the inside of said housing 1; and an outside air introduction mechanism 15 installed on said housing 1 for opening up an airtight condition of the housing.

20 Claims, 11 Drawing Sheets

ROTARY POWDER COMPRESSION MOLDING MACHINE

CROSS REFERENCE TO RELATED APPLICATIONS

This application claims priority under 35 U.S.C. 119 based upon PCT patent application Ser. No. PCT/JP03/12683, filed on Oct. 2, 2003. The entire disclosure of the aforesaid applications is incorporated herein by reference.

BACKGROUND OF THE INVENTION

1. Field of the Invention

The present invention relates to a powder compression molding machine for producing powder compression molded articles such as drugs, foods and electronic components.

2. Description of the Prior Art

Conventional rotary powder compression molding machines have a rotary table, arranged to rotate horizontally by means of a vertical shaft within a housing. A plurality of dies are arranged at a fixed pitch on this rotary table. Above and below each die is kept an upper punch and a lower punch enabled to slide up and down. The upper punch and lower punch, which have their punch points inserted within the dies, are passed between an upper roller and a lower roller. Generally, the machine is constructed so that the materials, such as drug powders, which fill up the inside of the dies are then compression molded.

In such a powder compression molding machine, the inside of the housing will be depressurized to a pressure lower than atmospheric pressure. For example, Patent Literature 1 (Official Gazette Publication No. Sho 43-25910) discloses one that compresses powder after such depressurization. In such depressurized powder compression molding machines, higher decompressions form better quality molded articles. Thus, the maintenance of the seals becomes important.

In the machine mentioned in Patent Literature 1, a rocker valve is arranged at the part where the powdery material is supplied, as well as at the part where the article is taken out. In this way, the supplying of the powdery material and the taking out of the article are accomplished in a condition where the direct communication between the interior and the exterior is cut off. In other words, this rocker valve has a rotatable partition. After supplying the powdery material at this partition at below atmospheric pressure, the partition is rotated and communicated with a depressurized interior. By this means, the above-mentioned powdery material is supplied to the depressurized interior of the housing.

However, with the above-mentioned rocker valve, at each partition, until the powdery material is supplied to it and to the interior of the housing, a sealed up state must be kept. It is necessary to perfect the tools at the internal circumference and both side surfaces of the rocker valve, in order to completely seal each partition.

However, when employing such tool constructions, the revolving resistance of the tool parts becomes great, when the rocker valve is rotated. This results in remarkable wear of the seals. When the tool sealing up the partition wears away in such an arrangement, the sealing degree within the partition drops. At the spots where the tool function thereby drops, the powdery material may then strongly scatter towards both the air and the interior of the housing. When such a situation occurs, the scattering of the powdery material within the housing interior becomes pervasive, and its cleaning becomes difficult.

Similarly, when a partition having its airtightness deteriorated in this fashion exists at the rocker valve, at the side for taking out the molded article, outside air can flow into the housing interior that has been depressurized, by means of the rocker valve. Thus, the depressurized state can no longer be formed. In this way, because air exists between the particles of the material supplied to the housing interior, the effectiveness of the depressurized compression molding cannot be sufficiently demonstrated.

Additionally, after finishing the compacting of the molded articles in the powder compression molding machine, it is necessary to clean out the powdery material sticking to and remaining within the interior. But, with a depressurized powder compression molding machine, after the molded article is molded and the decompression in the housing is released and opened to the external atmosphere, the powdery material remaining in the housing may scatter to this external atmosphere.

As discussed above, the depressurized powder compression molding machine handles a powdery material within a housing sealed up for airtightness, and compression molding is thereby accomplished to obtain the molded article. However, this process has the problems of maintaining airtightness, as well as the scattering of the internal powdery material when releasing the airtightness.

This invention solves such problems. Its purpose is to present a device that efficiently stops the scattering of the powdery material, while also maintaining the completely sealed up state from the supply of the powdery material and the discharge of the molded article, until the cleaning of the interior.

SUMMARY OF THE INVENTION

In accordance with the present invention, a powder compression molding machine having a housing for cutting off an inside from an outside atmosphere; a compression molding mechanism provided inside this housing for compression molding powdery material to a fixed form within this housing; a vacuum device connected to said housing through piping, for depressurizing the housing interior; an atmosphere cut-off mechanism for cutting off a piping interior atmosphere on said housing side from a piping interior atmosphere on the vacuum device side; a liquid supply mechanism for wetting said compression molding mechanism and powdery material stuck to the inside of said housing, within the atmosphere of the housing side starting from said atmosphere cut-off mechanism; and an airtight regulation mechanism installed on said housing for adjusting an airtight state of said housing.

Additionally, this apparatus may have a control device, connected at least to said compression molding mechanism, the atmosphere cut-off mechanism, and the liquid supply mechanism, wherein, after the compression molding by said compression molding mechanism finishes, this control device operates said atmosphere cut-off mechanism to cut-off the piping interior atmosphere of the housing side from the piping interior atmosphere of the vacuum device side, and then, in order to wet said compression molding mechanism and the powdery material stuck to the inside of said housing by using said liquid supply mechanism, said control device controls each mechanism.

Also, it may be preferable that said control device is also connected to said airtight regulation mechanism, and after wetting the powdery material by way of said liquid supply mechanism, said control device opens up the depressurized state of said housing.

According to such an arrangement, when cleaning the powder compression molding machine, in cases requiring the detachment of parts inside or the installation of devices needed for cleaning, one can wet the inside of the housing prior to opening up the housing to the outside atmosphere. Thus, one can prevent the scattering of the powdery material when opening the housing.

Additionally, according to such an arrangement, because the housing interior is sealed tightly and depressurized, one can produce the molded articles, safely cut-off from external factors such as temperature or humidity. Even when the powdery material has hygroscopicity or absorptions having possibly harmful influences on the human body, one can still produce the molded articles safely and with reliability. Thus, this arrangement is useful as a manufacturing apparatus for pills, nutritional supplement foods, and electronic components.

Also, for molding while leaving out air within the powdery material, even when the powdery material has the characteristic of low die fill, one can still sufficiently fill up the die, with this arrangement. One can control variations in the powdery material quantities used for each molded article, and further, the molded article quality related to solidity can be improved. Above all, it is good for use as a manufacturing apparatus for drugs.

According to the first embodiment of this invention, the powder compression molding machine further comprises a cleaning mechanism, installed within said housing after opening up a depressurized state of said housing interior, for cleaning said compression molding mechanism within said housing and the inside of said housing.

In this case, it may be preferable that after cleaning said powdery material in the state where the depressurized state of the housing is opened up by way of said airtight regulation mechanism, said control device closes said airtight regulation mechanism and operates the vacuum device, while also opening said atmosphere cut-off mechanism, and causes said housing interior to decompress dry.

According to such an arrangement, it becomes possible to, after the wetting of the powdery material for preventing the scattering of the powdery material, install the cleaning devices, clean the inside of the housing, and successively perform the drying.

Further, the depressurized state maintained in the housing interior of the powder compression molding machine in the present invention is lower than the atmospheric pressure. It may be good to have a state close to a vacuum, such as maintaining the housing interior pressure at 66.6 hPa (50 Torr)—666.4 hPa (500 Torr), and preferably 66.6 hPa (50 Torr)—133.3 hPa (100 Torr). It is hoped that this depressurized state can achieve a pressure even lower than the above-mentioned ranges. However, the application of vacuum states such as, for example, below 1 Pa (10—2 Torr) are not always necessary.

According to such an arrangement, since a powdery material supply mechanism supplies powdery material to the housing interior in a state where the inside pressure is depressurized, it is possible to reduce the amount of air remaining within the powdery material. Additionally, because the powdery material is supplied to the housing interior under decompression, the pressure difference between the inside pressure of the powdery material supply mechanism and the pressure inside the housing interior is extremely small. Thus, the drawing into the housing interior of the powdery material from the powdery material supply mechanism, due to the pressure differential, will not occur. Because of this, malfunctions such as the scattering in the housing interior of the powdery material can be canceled.

Additionally, if a mechanism for introducing outside air to the inside of the housing by providing an outside air introduction mechanism is an arrangement for discharging the atmosphere within the housing interior via a discharge mechanism, then dust and the like occurring due to molding is discharged to the housing interior and attendantly to the outside. Because of this, during molding, even if very small amounts of powdery material scatter from the die bore, it is possible to prevent the deterioration of the housing interior atmosphere.

It may be preferable for the discharge mechanism to have a vacuum device for exhaust the atmosphere in the housing interior, as well as a derivation line for deriving atmosphere, having an opening at a particular site in the housing interior. This derivation line connects to the vacuum device, for efficiently discharging powdery material that was not molded. With such an arrangement, it may be desirable that the particular site is at least in the upper surface vicinity of a rotary table. By having this particular site established in the vicinity of the upper surface of the rotary table, the derivation line can reliably catch the very small quantities of powdery material that scatter from the die bore during compression.

Also, by establishing the particular site in this way, it becomes possible to emit heat, accumulated at the rotary table, that occurs during operations. In other words, due to the derivation line's opening in the upper surface vicinity, an air flow occurs in the upper surface vicinity of the rotary table. This air flow cools the rotary table. As thus described, by cooling the rotary table, one can prevent the raising of the rotary table's temperatures. This improves productivity and removes heat effects on the powdery material.

In order to smooth the supplying of the powdery material and the discharge of the molded articles, it may be preferable that the depressurized states of the powdery material supply mechanism and the molded article discharge mechanism at least roughly equal the housing interior's depressurized state. In other words, the depressurized states of the interior pressures of the powdery material supply mechanism and the molded article discharge mechanism, roughly equals the interior pressure of the housing interior—that is, they match with both having states of roughly no pressure differential. In this way, one can prevent sudden movements due to pressure differentials at the powdery material and the molded articles.

The outside air introduction part, for easily adjusting to a desired value the housing interior pressure having a depressurized state, may preferably comprise an adjusting device. It is provided at an upper part of the housing, for adjusting the amount of outside air introduced. This adjusting device may include, as an example, a valve having a manually operated or automatic means of changing the area of the opening through which outside air passes through.

Along with reliably supplying powdery material, the powdery material supply mechanism may, in order to simply the arrangement, preferably be furnished with a hopper for pooling the powdery material. When the hopper has a depressurized state, it communicates with a fixed quantity supply device, which supplies the powdery material supply mechanism for arranging a prescribed quantity of powdery material above the rotary table.

Similarly, the molded article discharge mechanism may be provided with a first pooling container for pooling under decompression molded articles discharged from a die, a second pooling container for discharging under atmospheric pressure molded articles supplied from the first pooling container, and a valve for selectively, through reciprocation, communicating the first pooling container with the second pooling container.

In this way, by using a reciprocating valve, to selectively communicate the first pooling container with the second pooling container, one can prevent the decreasing of airtightness of the valve, due to the sticking of powdery material stuck to the molded articles.

In addition, other features and effects of the present invention not mentioned in this section will become clear to persons skilled in the art, from the following paragraphs and attached drawings regarding the modes of carrying out the invention.

DETAILED DESCRIPTION OF THE PREFERRED EMBODIMENTS

One embodiment of the present invention will be explained below, referring to FIGS. 1-11.

Figure 1:
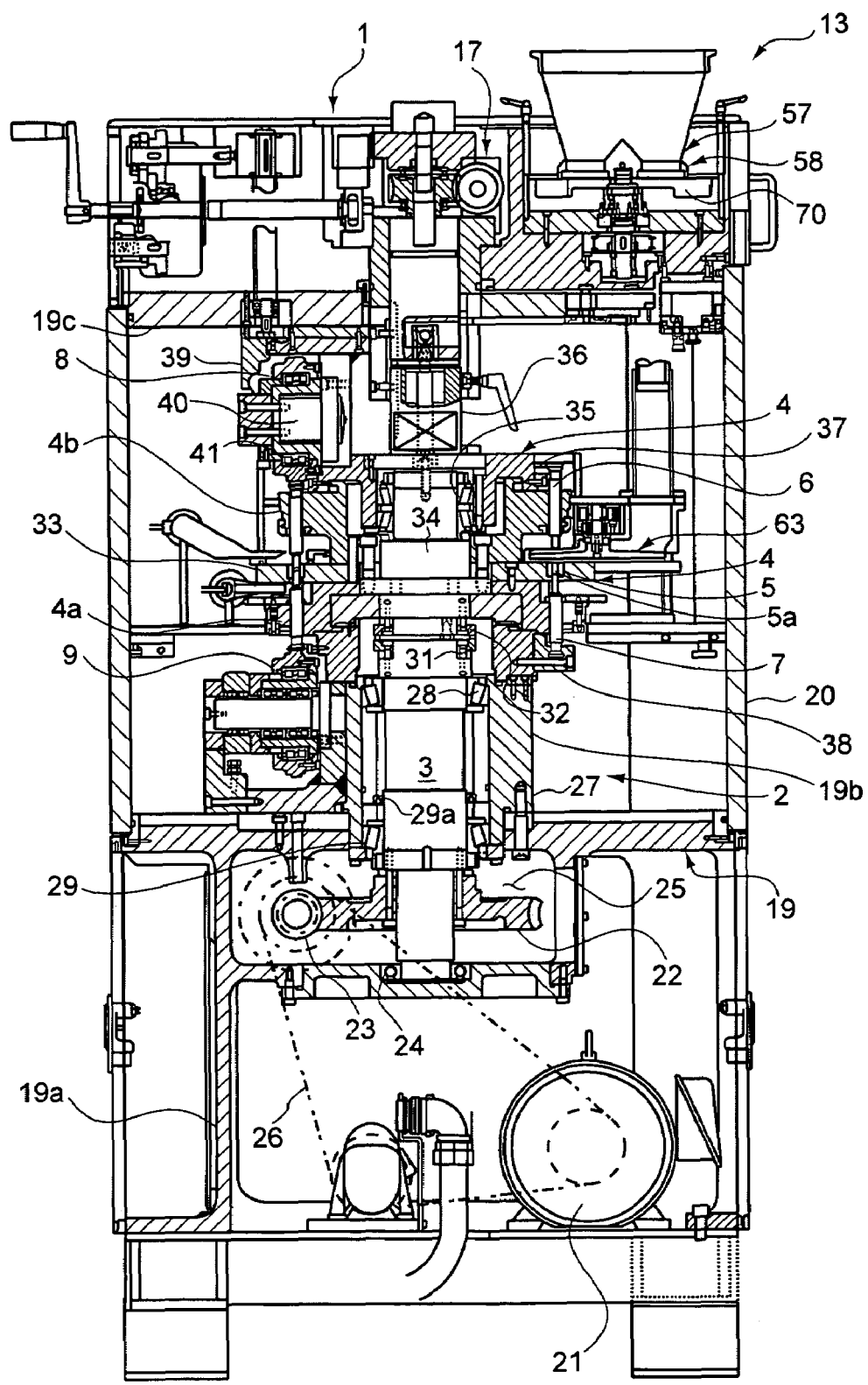
FIG. 1 A sectional drawing showing one embodiment of the rotary powder compression molding machine of the present invention.

FIG. 1 is a longitudinal sectional drawing showing the rotary powder compression molding machine involved in the present embodiment. This powder compression molding machine has a housing 1 for cutting off the inside of the molding machine from the outside atmosphere. It also has a compression molding mechanism 2 provided in this housing 1, for compression molding, within the housing 1, a powdery material into a prescribed form.

As shown in FIG. 1, this compression molding mechanism 2 has, by means of a vertical shaft 3 within the housing 1 as the rotating axis, a rotary table 4 arranged to be horizontally rotatable. A plurality of dies having a die bore 5a is installed at a fixed pitch on the rotary table 4. Above and below each die 5 is an upper punch 6 and a lower punch 7, kept to be slidable in up-down directions. Additionally, an upper roller 8 for pushing the upper punch 6 and a lower roller 9 for pushing the lower punch 7, are arranged above and below the rotary table 4, with the vertical shaft 3 as their centers.

Then, while spinning the rotary table 4, with the respective tips of the upper punch 6 and the lower punch 7 inserted within the die bore 5a, the upper punch 6 and the lower punch 7 are passed between the upper roller 7 and the lower roller 8. The powder or granule powdery material filling up the die bore 5a is thus compressed and molded.

Figure 2:
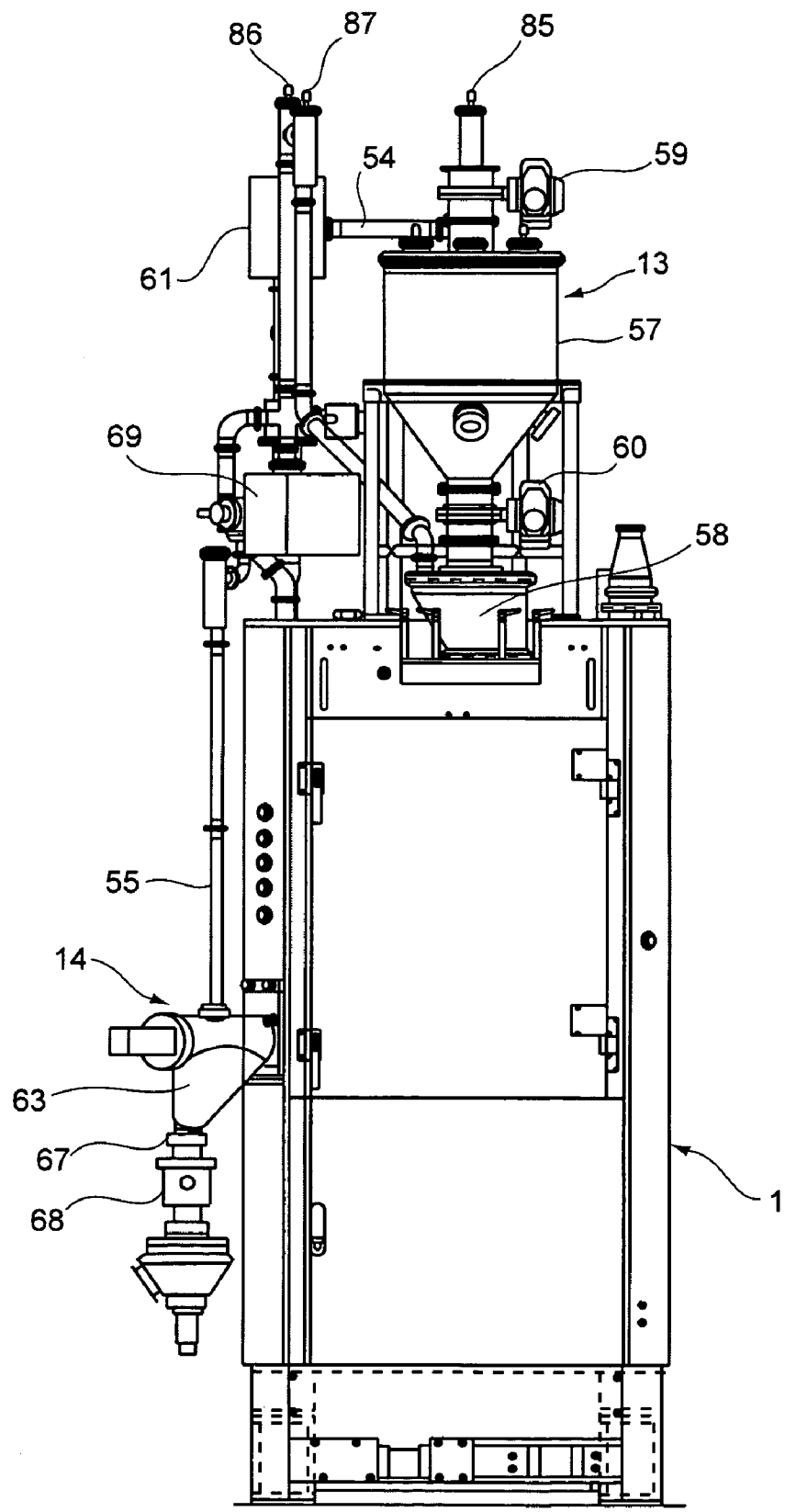
FIG. 2 A front elevational view of the same.
Figure 3:
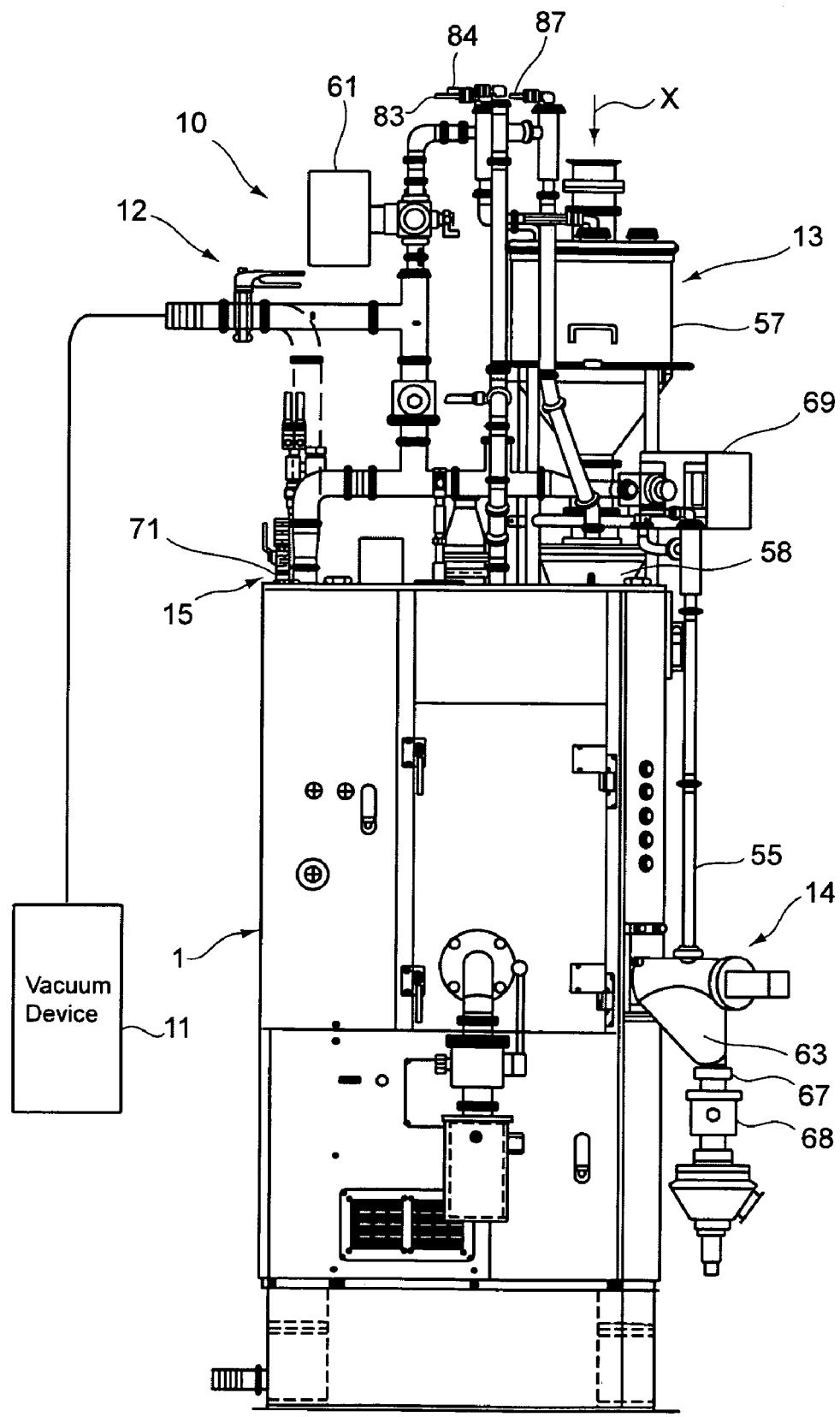
FIG. 3 A side elevational view of the same.
Figure 4:
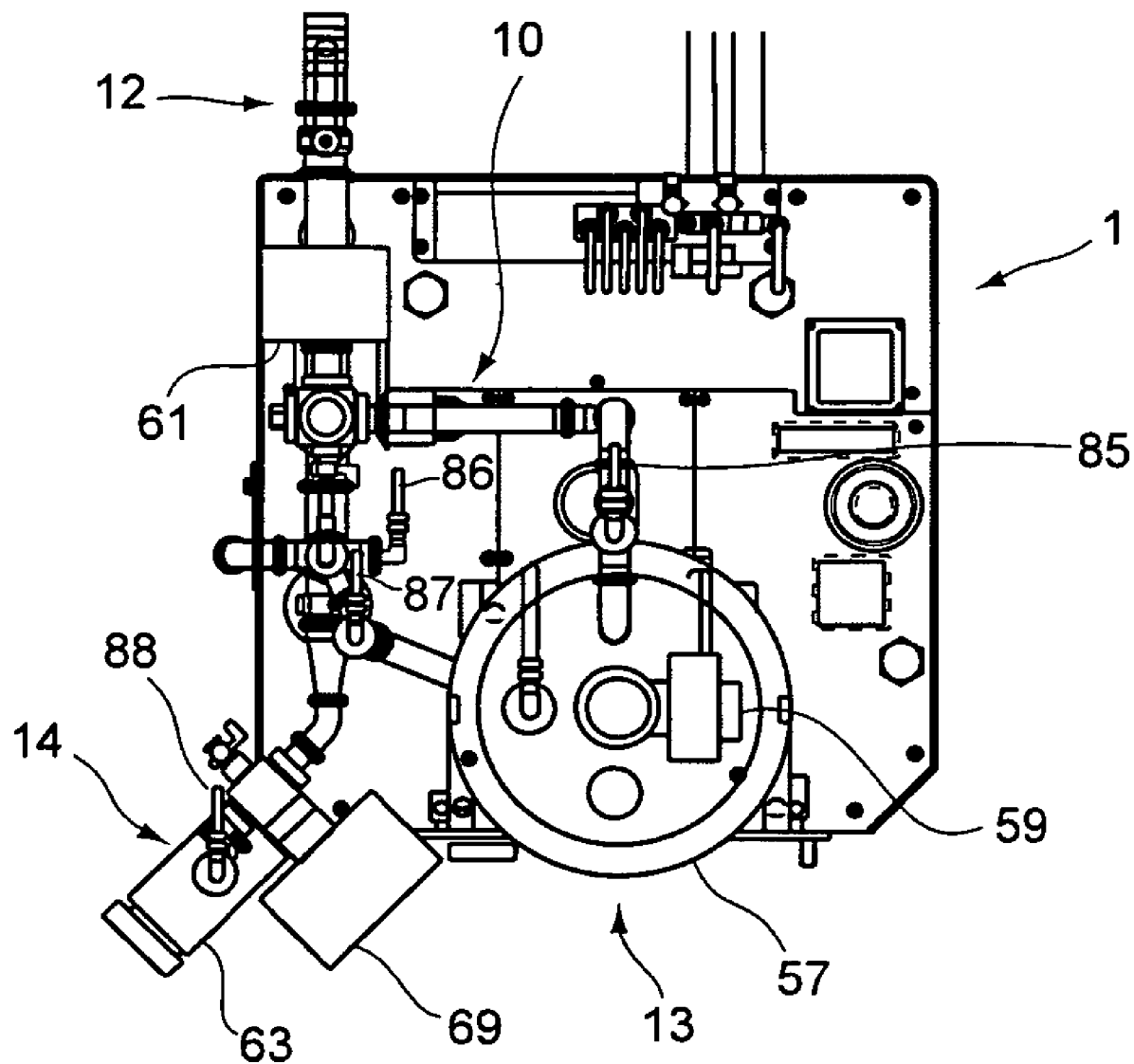
FIG. 4 A top plan view of the same.

FIG. 2 and FIG. 3 show the outside front elevational and outside side elevational views of this rotary powder compression molding machine.

As shown in FIG. 3, this molding machine has, connected to said housing 1 through a piping system 10, a vacuum device 11 for depressurizing within said housing. Also installed on the piping system 10, is provided an atmosphere cut-off valve 12 (atmospheric cut-off mechanism), for intercepting the pipe interior atmosphere on said housing 1 side from the pipe interior atmosphere on the vacuum device 11 side.

The piping system 10 from the vacuum device 11 is also connected to a powdery material supply mechanism 13 for supplying the powdery material into the housing 1. This powdery material supply mechanism 13, which will be described in detail later, is made of a hopper or the like. When the powdery material is being taken into the its interior, its internal pressure is kept at air pressure, and when the powdery material is being supplied into the housing 1, its internal pressure is depressurized.

Furthermore, the piping system 10 from the said vacuum device 11 is also connected to a molded article discharge mechanism, shown as 14 in the drawing. This molded article discharge mechanism 14 is for discharging to the outside of the housing 1, a molded article such as a tablet or the like, which has been molded by the compression molding mechanism 2 within said housing 1. Although the detailed construction will be described below, when taking in a molded article from the housing 1 to its interior, the internal pressure is depressurized. When the molded article is sent to the exterior, the internal pressure is kept at air pressure.

Additionally, as shown in FIG. 3, an outside air introduction mechanism 15 (airtight regulation mechanism) is provided for introducing fresh air into the housing 1, and for opening up the depressurized state within the housing to return it to atmospheric pressure.

Below, each organization of this powder compression molding machine will be described more clearly.

Firstly, this embodiment is composed such that, in a state where said upper punch 6 (FIG. 1) and lower punch 7 are coupled to the rotary table 4, the rotary table 4 is detachable from the vertical shaft 3. To put it concretely, in order to separate the rotary table 4 from the vertical shaft 3, the rotary table is lifted above once from the up-down mechanism 17. From that lifted position, it is taken out of the housing 1 by using a conveyance device (not illustrated). When detaching the rotary table 4 from the vertical shaft 3, the upper roller 8 can interfere with the raising movement of the rotary table. Thus, the upper roller 8 is composed to be able to move to a position where such interference is evaded.

As shown in FIG. 1, said housing 1 comprises a frame 19 and an exterior body 20 for enabling the sealing of the interior space surrounded by the frame 19. In other words, while attaching to the frame 19 the rotary table 4 and other mechanical parts required for the compression molding mechanism, the housing 1 also has the exterior body 20 surrounding the frame 19 for forming a tightly sealed space within its interior. The frame 19 comprises a frame lower part 19a and a frame upper part 19b, which is fixed above the frame lower part 19a. This arrangement has the purpose of sectioning between the molding unit used for the compression molding, and the drive unit for driving the rotary table 4 at this molding unit. Such an arrangement should be configured so that, at a minimum, the space formed by the frame upper part 19b can become sealed up.

Basically, the frame lower part 19a has in its interior a main motor 21. Above the main motor 21 is a worm wheel, a worm 23 for engaging with the worm wheel 22, and a gear chamber 25, for receiving a vertical shaft bottom bearing 24 that supports the rotation of the bottom tip of the vertical shaft 3. The rotation of the main motor 21 is transmitted to the worm 23 by way of a belt 26. Additionally, a support member 27 for supporting the vertical shaft 3 is fixed to the outside of the gear chamber 25. Upper and lower tapered roller bearings 28, 29 inside the support member 27 supportably enable the rotation of the vertical shaft 3, as well as maintaining airtightness. Because the lower tapered roller bearing 29 is sealed up by an oil-seal 29a, the airtightness of the frame upper part 19b will not deteriorate at the circumferential portions of the vertical shaft 3. In other words, with this type of structure, the interior of the frame lower part 19a is isolated from and does not communicate with the upper side of the frame upper part 19b, at which the rotary table 4 is arranged. Thus, the reduced pressure condition of the frame upper part 19b will not be disturbed.

In addition, the vertical shaft 3 is formed to be limited to width-diameters that enable higher rigidity. It is arranged to rotate freely within roughly the central part of the housing 1, by way of the above-mentioned vertical shaft bottom bearing 24 and the upper and lower tapered roller bearings 28, 29. A worm wheel 22 is fixed to the part of the vertical shaft 3 accommodated by the gear chamber 25—that is, in the vicinity of the bottom tip portion. A lower clutch plate 31 as a joint mechanism is fixed to the upper tip portion.

Rotary table 4 consists of a rotary table lower portion 4a and a rotary table upper portion 4b. The rotary table lower portion 4a slidably retains the lower punch 7. The rotary table lower portion 4a also supports a die table 33, for detachably retaining the die 5 at upon an identical periphery, at a fixed pitch. Again, the rotary table upper portion 4b slidably retains the upper punch 6. The rotary table upper portion 4b also supports a central shaft 34, which selectively connects with the vertical shaft 3 through an upper clutch plate 32 as a joint mechanism, and it also supports a suspension shaft 36, installed at the upper tip portion of the central shaft 34 by way of a bearing 35. The suspension shaft 36 is pushed during its operation by the up-down mechanism 17, and functions as a bearing for the rotary table 4. When removing the rotary table 4, it also functions as a connecting part between the suspension shaft 17 and the rotary table 4.

The lower clutch plate 31 and the upper clutch plate 32 form a joint mechanism. As shown in Japanese Patent No. 2992529 which is owned by the present applicant (the subject matter of which is hereby incorporated into the present specification by reference), they have circular ring shapes, and they have pluralities of teeth which complement the axis direction and which are provided at a fixed pitch. When this joint mechanism is a meshing clutch, it does not need to be limited to the above explanation.

The upper punch 6, retained by the rotary table 4, is guided by a guide rail 37, which is installed at the peripheral wall of the bottom tip portion of said suspension shaft 36. It is guided to the utmost highest position in the vicinity of the location where the powder fills up, and also, at a location where it reaches the upper roller 8, it is guided to a low position where it goes beneath the upper roller 8. The upper punch 6 and the lower punch 7 are composed such that, in a state where the rotary table 4 is separated from the vertical shaft 3, they are retained by the rotary table 4 and can be detached together with the rotary table 4, the guide rail 37 and the fill cam 38 and the like.

Figure 5:
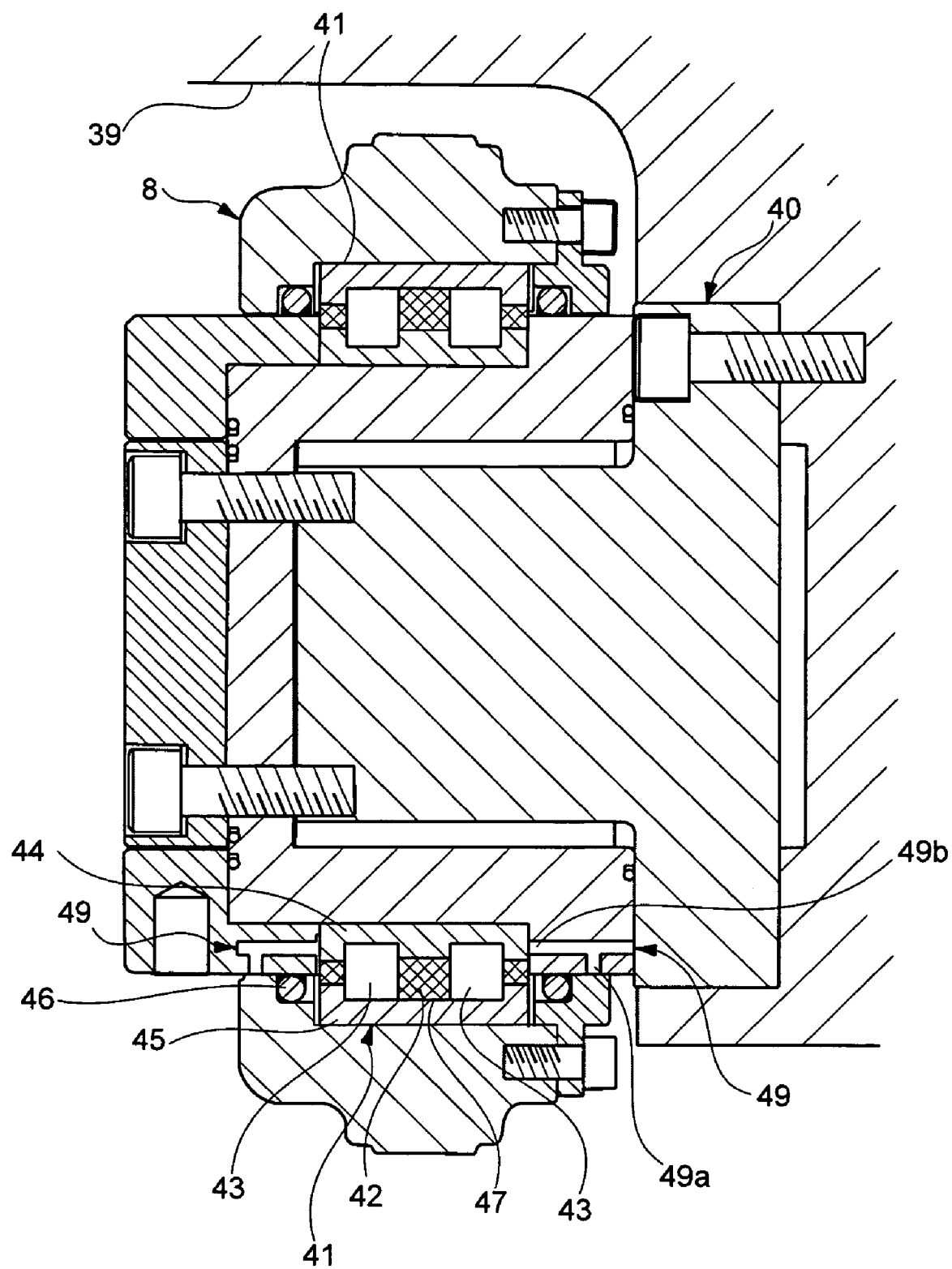
FIG. 5 A sectional drawing of the same showing the part including the upper roller in magnification.

The upper roller 8 is slidably installed at a lower surface of a sideways beam portion 19c of the frame upper part 19b. In other words, the upper roller 8 is rotatably installed through a bearing 41 on an installation shaft unit 40, which is provided on an installation block 39. Typically, the installation block 39 is fixed immovably on the frame upper part 19b, and when such fixing is released, the installation block 39 can then move slidably. FIG. 5 is a longitudinal sectional drawing showing the surroundings of this installation block 39. As shown in FIG. 5, the bearing 41 of this upper roller 8 is structured to prevent leakage from the interior, of air remaining within grease 42. In other words, the bearing 41 has grease 42 filled up between an inner ring 44 and an outer ring 45, at which a plurality of rollers 43 are arranged at a fixed pitch. However, this grease 42 was filled at below atmospheric pressure, and thus, it is contaminated with air.

Therefore, in an environment under decompression, that air gets pulled to the decompressed side. As an example, an O-ring having flexibility or a sealing member 46 from an oil seal having a lower resistance to rotation than the O-ring will become deformed. In order to prevent this, the bearing space 47 where the grease 42 sealed up by the sealing member 46 is filled, has the same pressure as the housing interior pressure. This is done by way of a ventilation hole 49 provided on the installation shaft unit 40. This ventilation hole 49, has one end 49a opening towards the internal circumference surface side, and the other end 49b opening towards the bearing space 47 at the inner ring 44. Additionally, the gap between the facing surfaces at each end 49a, 49b has measurements for preventing leakage of the grease 42. This type of bearing 41 construction, where the pressure of the bearing space 47 roughly resembles the pressure of the surrounding environment, that is, the housing 1 interior pressure, can also apply to every bearing used within the frame upper part 19b.

Furthermore, said upper and lower rollers 8, 9 are each illustrated in FIG. 1 from the side for ease of understanding of their construction. Also, there are pairs of them, for standby compression use and actual compression use, but one has been omitted and only the other is shown. In order to clearly show the positional relationships among the frame 19, vertical shaft 3 rotary table 4, the up-down mechanism 17 and the like, the parts such as those for removing the molded article were also omitted from the illustration. Still further, each sectional drawing and the like has differing reduction scales and aspect ratios. Each drawing is for the purpose of explanation only, and the actual device will of course have those various coordinations made.

Next, the piping systems and their controls for ventilation, wetting, cleaning and drying will be explained.

Figure 7:
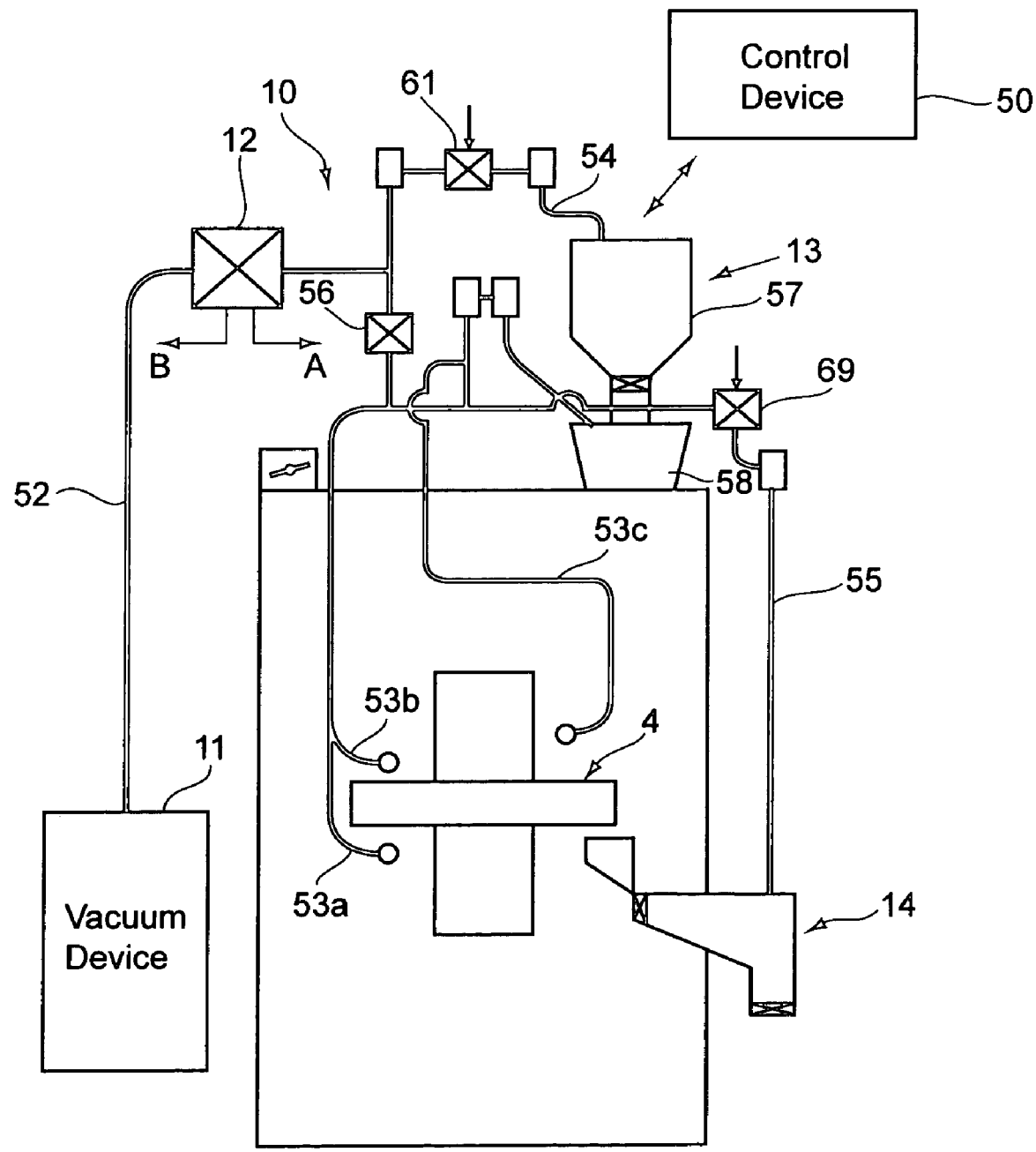
FIG. 7 A piping schematic drawing of the same showing the piping system for depressurizing.

FIG. 7 shows the exhaust piping system 10 (shown in bold lines in the drawing) connected to said vacuum device. It is also an outline organizational diagram showing the control device 50 for controlling such a piping system. The control device 50 is connected by each of the above-explained mechanisms, as well as by drivers to be explained below, that are not illustrated in each organizational drawing. The control device 50 is programmed to control such members.

As mentioned previously, an ambient atmosphere cut-off valve 12 is provided on said exhaust piping system 10, to intercept between the ambient atmosphere at the housing 1 side and the ambient atmosphere at the vacuum device 11 side. In this embodiment, this ambient atmosphere cut-off valve 12 may be workable by an electromagnetic device, as an example. Upon command from said control device 50, after the molding by said compression molding mechanism is finished, the valve operates and cuts off between the ambient atmosphere at the housing 1 side (shown as A in the drawing) and the ambient atmosphere at the vacuum device 11 side (shown as B in the drawing).

Although not illustrated in this drawing, filters or dust collecting equipment for taking away the powdery material within the exhaust may be provided at the pipe 52 at said vacuum device 11 side. The filters or dust collecting equipment may be provided along the pipe 52, or they may be provided integrally with said vacuum device 11. Also, although not limited to such types, the vacuum device 11 may be for example an aspirator or a vacuum pump such as a dry vacuum pump, established on the outside of the housing 1.

The piping system at the housing 1 side has derivation lines 53a-53c which open at particular sites within the housing 1, for deriving the ambient atmosphere. It also has a powdery material supply side pressure adjusting line 54, which connects with said powdery material supply mechanism 13, as well as a discharge side pressure adjusting line 55, which connects with said discharge mechanism 14.

Of these, the first derivation line 53a opens to an area which is the first specified area, that is, a site at least within the vicinity of the outer side of the rotary table's 4 interior. Basically, it should open to a site which is the outer side of the rotary table's 4 die table 33, as well as, for example, being able to correspond to the place of compression positions of the upper punch 6 and the lower punch 7. Additionally, the second derivation line 53b opens to the inside of the die table 33 at the interior of the rotary table 4. The third derivation line 53c opens to the inside front side of the rotary table 4. These opening sites of the first—third derivation lines 53a-53c should be established corresponding to sites where the powder leaking from the die 5 when compressing, although a very small amount, can be reliably suctioned.

Also, through such establishments, a current of air can be made to occur at the top-bottom surfaces of the rotary table 4, enabling the simultaneous cooling of the rotary table 4 along with the suctioning of the leaked powder.

An open-shut valve 56 is provided upstream from the piping system connected to the above-mentioned first and second derivation lines 53a, 53b. This open-shut valve 56 prevents the introduction into the housing 1 interior of the atmospheric pressure at said powdery material supply mechanism 13, at the time of powdery material supplying.

When taking in powdery material to the inside, the inside pressure is maintained at atmospheric pressure, and when supplying the powdery material to the housing 1 interior, this inside pressure will be depressurized. This mechanism is provided with a hopper 57 connected to said pressure adjusting line 54 and with a fixed quantity supply device 58.

The hopper 57 is for accepting and pooling the powdery material while its inside pressure is kept at atmosphere pressure. This powdery material is supplied from a pool in a high capacity storage room (not illustrated), or from a conveyance line (not illustrated), which is arranged above it. As shown in FIG. 2, the hopper 57 is furnished at its upper portion with an inlet valve 59 consisting of a butterfly valve, and with, at its lower portion and able to communicate with the fixed quantity supply device 58, a delivery valve 60 consisting of a butterfly valve. This inlet valve 59 and this delivery valve 60 open and close according to the amount of powdery material pooled within the hopper 57 and within the later discussed fixed quantity supply device 58. In addition, the inlet valve 59 opens when the hopper 57 interior is kept at atmospheric pressure, and it closes completely when the hopper 57 interior is depressurized. Correspondingly, the delivery valve 60 is closed when the hopper 57 interior is kept at atmospheric pressure, and it opens when the hopper 57 interior is depressurized.

The powdery material supply side pressure power adjusting line 54 communicates with the hopper 57, and also selectively communicates with the vacuum device 11 and the outside space, through a three way valve 61 (referring also to FIG. 7). In other words, by switching over the first three way valve 61, the hopper 57 interior communicates with the outside space and the hopper 57 interior pressure becomes equal to the atmospheric pressure. Also, by switching over the first three way valve 61, the hopper 57 interior communicates with the vacuum device 11, and the hopper 57 interior's atmosphere is exhausted and depressurized. Additionally, the first three way valve 61 can be switched over, through use of the said control device 50, according to the state of the powdery material supply.

On the other hand, as shown in FIG. 1, the fixed quantity supply device 58 has a rotor 70 at the bottom part, and when the hopper 57 has a depressurized state, the fixed quantity supply device 58 communicates with the hopper 57 and supplies powdery material from it. A set amount of powdery material is supplied to the powdery material fill portion above the rotary table 4, through the rotations of the rotor 70. Accordingly, as shown in FIG. 7, this fixed quantity supply device 58 causes depressurization to occur to roughly the same pressure as that in the housing 1 interior, due to its being connected in the same system as derivation lines 53a-53c. This is necessary in order to keep the powdery material from getting drawn into the housing 1 interior due to a pressure differential. In this way, for example, when the inside of the hopper 57 has an atmospheric pressure state, one can prevent the instantaneous changing of the pressure inside the fixed quantity supply device 58.

Figure 6:
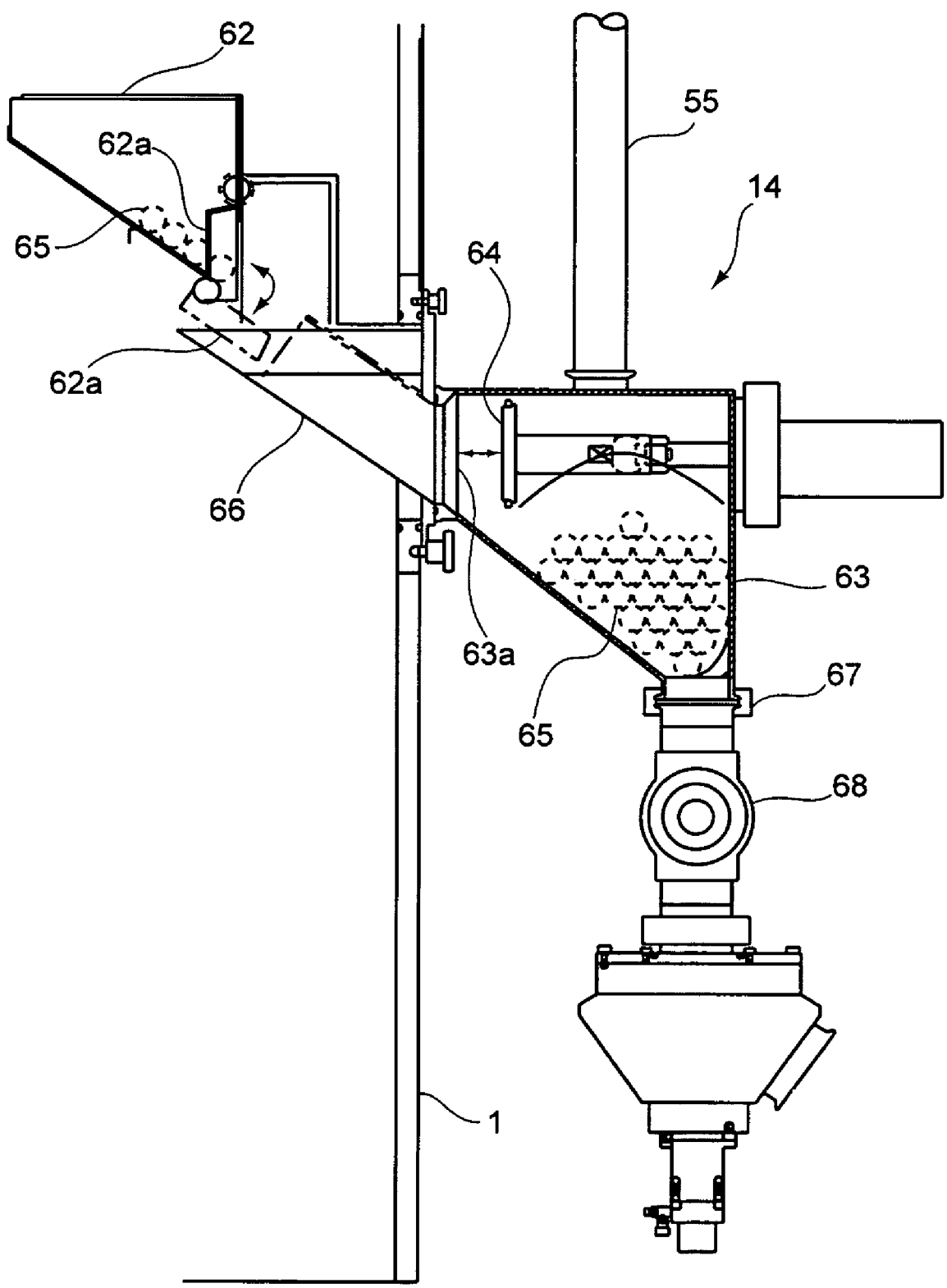
FIG. 6 A sectional drawing of the same showing the molded article discharge mechanism in magnification.

Next, as shown in FIG. 6, the molded article discharge mechanism 14 comprises a first pooling container 62 for pooling under depressurization the molded articles (shown by dotted lines 65 in the drawing) discharged from the die 5; a second pooling container 63 for discharging under atmospheric pressure molded articles 65 supplied from the first pooling container 62; and a valve 64 for selectively communicating through reciprocation between the first pooling container 62 and the second pooling container 63. As mentioned above, said pressure adjusting line 55 is connected to the molded article discharge mechanism 14, for adjusting the pressure at the second pooling container 63 interior.

Here, said first pooling container 62 is located to correspond to a place in the housing 1 interior where its upper end can take out the molded articles 65 from the die bore 5a, and it comprises a door 62a at its lower rim portion, which opens-closes centralized on the lower rim portion. A conveyance path 66 for the molded articles 65 is provided between the first pooling container 62 and the second pooling container 63, and its bottom end communicates with the inlet 63a of the second pooling container 63.

The second pooling container 63 is installed in a condition of being pushed out of the housing 1, and its inlet 63a opens-closes through the transversely reciprocating valve 64. In addition, an exit 67 is arranged at the bottom end of the second pooling container 63, for taking out the molded articles 65. This exit 67 can substantially open-close through an exit valve 68, such as a butterfly valve.

Said discharge side pressure adjusting line 55 communicates with the second pooling container 63, as well as communicating selectively with the vacuum device 11 and the outside space through a second three way valve 69, as shown in FIGS. 2, 3, 4 and 7. In other words, the discharge side pressure adjusting line 55 communicates the second pooling container 63 interior to the vacuum device 11 through the switching over of the second three way valve 69, and it exhausts and depressurizes the atmosphere at the second pooling container 63 interior. Also, it communicates the second pooling container 63 interior to the outside space from again switching over the second three way valve 69, and makes the pressure at the second pooling container 63 interior equal to the atmospheric pressure. This second three way valve 69, similarly to the first three way valve 61 arranged on the powdery material supply side pressure adjusting line 54, can be switched over according to the pooling state of the molded articles 65, through said control device 50.

Said outside air introduction mechanism 15 is arranged, for example, at the upper portion of the housing 1 as shown in FIG. 3 and the like, and comprises a flow control valve 71 as an adjusting device for controlling the flow of outside air taken in. Usually, the pressure at the housing 1 interior is determined by the exhausted amount of the vacuum device 11 and the flow control amount of the flow control valve 71. If the exhausted amount is kept fixed, the pressure at the housing 1 interior can be controlled by controlling the flow control valve 71. The flow control valve 71 can be hand-controlled or automatically controlled. Additionally, although the explanation is omitted, one can have an arrangement where a pressure sensor is arranged for measuring the pressure inside the housing. Thus, the pressure at the housing 1 interior can be observed by said control device 50 before and during the operations, based on the output signals outputted by this pressure sensor. Or, when the detected pressure based on the output signal of such a pressure sensor exceeds the aimed for pressure, the flow control valve 71 at said flow control device 50 can be automatically controlled in a squeezing manner. When said detected pressure is less than the aimed for pressure, the flow control valve 71 can be maintained at the opening degree of that point in time, or the flow control valve 71 can be automatically controlled so that the detected pressure roughly equals the aimed for pressure.

With such an arrangement of this rotary powder compression molding machine, when its operates the vacuum device 11 operates, so that the housing 1 interior can usually be maintained at a pressure state lower than the atmospheric pressure—that is, in a decompressed state. In other words, the vacuum device 11 is worked before operation and the opening degree of the flow control valve 71 is adjusted, to decompress the housing 1 interior pressure to a set value. In this case, the set value can be, for example, established within the range of 66.6 hPa (50 Torr)—133.3 hPa (100 Torr), and values as low as possible within this range are desirable. As mentioned above, once the vacuum device operates, it can continuously operate with identical capability—that is, without variation in the exhausting quantities.

In this manner, when the vacuum device 11 operates, the housing 1 interior's atmosphere is discharged to the outside via derivation lines 53a-53c, and the outside air flows into the housing 1 interior by way of the flow control valve 71. Accordingly, by squeezing the flow control valve 71—that is, by reducing the amount of outside air flowing in, the pressure in the housing 1 interior can be lowered. In contrast, by opening the flow control valve 71—that is, by increasing the amount of outside air flowing in, the pressure in the housing 1 interior can be raised. With the vacuum device 11, once the operation is started, it should continuously operate in order to maintain the decompressed state in the housing 1 interior. And once the housing 1 interior has the prescribed pressure state that is lower than the atmospheric pressure, the compression of the powdery material becomes possible.

After this, the powdery material is supplied the to the hopper 57. In this case, the inlet valve 59 and delivery valve 60 are closed, the three way valve 61 at the pressure adjusting line 54 is operated, and the pressure at the interior of the hopper 57 is controlled to roughly equal the atmospheric pressure. At the time when the hopper 57 interior reaches roughly the atmospheric pressure state, the inlet valve is opened, and as shown as X in FIG. 3, the powdery material is supplied the hopper 57.

When a prescribed amount of powdery material is supply the hopper 57, the inlet valve 59 is closed, and also the first three way valve 61 is switched over, and the hopper 57 interior is decompressed. At the time when the pressure in the hopper 57 interior roughly equals the pressure in the housing 1 interior, the delivery valve 60 at the hopper 57 is opened, and the powdery material in the hopper 57 interior is supplied the fixed quantity supply device 58.

In this way, the hopper 57 interior pressure is made roughly equal to atmospheric pressure and the powdery material is supplied into the hopper 57. Then, the hopper 57 interior pressure is brought to roughly the housing 1 interior's depressurized pressure, and the powdery material is disbursed to the fixed quantity supply device 58. Therefore, in the case where the powdery material is substantially supplied to the housing 1 interior, the hopper 57 interior would not have a pressure higher than the housing 1 interior pressure. In other words, when supplying the powdery material, a pressure differential between the hopper 57 and the housing 1 will not be produced. Accordingly, one can prevent the powdery material from suddenly moving from the hopper 57 to the housing 1 interior. The scattering of the powdery material in the housing 1 interior can be reliably prevented. Also, one can prevent the soaring of the pressure in the housing 1 interior.

Again, since the powdery material supplied to the fixed quantity supply device 58—or the disbursement—is effected when the inside pressure of the hopper 57 is in a decompressed state, the powdery material pooled in the fixed quantity supply device 58 has a decreased amount of air mixed in. Therefore, when the powdery material fills up the die 5 and is compression molded, the scattering from the mixed in air and the powdery material at the die 5 can be minimized. From such decrease in the mixing in of air, one can also achieve at least the rough uniformity of the solidity of the molded articles 65, and also the improvement of the quality of the molded articles 65.

In this way, after reaching the state where the powdery material can be supplied to the die 5, when the rotary table 4 is rotated, the powdery material fills up the die bore 5a in a state where the punch point of the lower punch 7 is inserted into the die bore 5a.

After that, the punch point of the upper punch is inserted into the die bore 5a. In that state, the upper punch 6 and the lower punch 7 passes through the gap between the upper roller 8 and the lower roller 9, and the powdery material in the die 5 interior is compression molded. This operation of compression molding is the same as those well known in the art for such operations under atmospheric pressure, excepting operations done under decompression.

The amount of mixed in air can be reduced due to the hopper 57 interior being decompressed before the fixed quantity supply device 58 is supplied, but a very small amount still remains. This type of air can be a primary factor in causing the powdery material to scatter from the die 5 when the powdery material is compression molded. In this embodiment the first—third derivation lines 53*a*-53*c* have openings in the vicinity of the upper and lower surfaces of the rotary table 4. Thus, the extremely small amounts of powdery material that scatter from the die 5 are absorbed into derivation lines 53*a*-53*c* and are discharged to the outside. Therefore, the scattering of the powdery material into the housing 1 interior, due to leakage from the die 5 during compression molding, can be prevented.

At this point, because the leaked powdery material is sucked into the first—third derivation lines 53*a*-53*c*, the atmosphere surrounding the rotary table 4 gets simultaneously sucked in. As a result, the heat in the surroundings heated by the rotary table 4 is sucked in and discharged, so that the rotary table 4 generating heat can be cooled. In other words, when the compression molding begins, generally the temperature rises because the respective punch points of the upper punch 6 and the lower punch 7 rub against the die 5. In a decompressed state, the degree of heat conductivity is lowered, so that the heat that occurs easily remains behind at the rotary table 4 interior.

However, since derivation lines 53*a*-53*c* have openings in the vicinity of the upper and lower surfaces of the rotary table 4, air flow occurs in these parts. Accordingly, the heat occurring at the rotary table 4 gets transmitted by the air current and discharged to the outside. Thus, the rotary table 4 gets cooled, and the changing of the dimensions of the die 5, the upper punch 6 and the lower punch 7 is controlled to a minimum. This means that one can cancel malfunctions such as the varying degrees of solidity of the molded articles 65, due to unstable pressures during molding, resulting from such various changes in dimensions.

The molded articles 65 that were compression molded under decompression are collected in the first pooling container 62. The first pooling container 62 usually has the door 62*a* closed. When the inside pressure of the second pooling container 63 becomes decompressed, the door 62*a* opens and the pooled molded articles 65 are disbursed towards the second pooling container 63. In other words, when the inside pressure of the second pooling container 63 becomes decompressed, the molded articles 65 collected at the first pooling container 62 are moved to the second pooling container 63.

The second pooling container 63, in a shut tight state with the valve 64 and the exit valve 68 closed, communicates with the vacuum device 11 due to the operation of the second three way valve 69 at the discharge side pressure adjusting line 55. The inside atmosphere of this container is exhausted and becomes decompressed. In this manner, when the second pooling container 63 interior becomes decompressed, the respective inside pressures of the first pooling container 62 and the second pooling container 63 reach equilibrium. Thus, when the valve 64 of the second pooling container 63 is opened, the molded articles 65 will not flow backward towards the housing 1 interior. Also, despite the opening of the valve 64 of the second pooling container 63, the outside air will not flow into the housing 1 interior due to the second pooling container 63, and the pressure in the housing 1 interior will not change. Thus, compression molding can continue under a stabilized, decompressed pressure.

In a state where the valve 64 is closed and the exit valve 68 is closed, the three way valve 69 at the discharge side pressure adjusting line 55 is switched over. When the pressure inside the second pooling container 63 interior reaches roughly the atmospheric pressure, the exit valve 68 is opened and the molded articles 65 pooled in the second pooling container 63 can be taken out. Since the molded articles 65 are disbursed in this manner with the second pooling container 63 interior in an atmospheric pressure state, the molded articles 65 can easily be collected. In this case, since the second pooling container 63 is independent of the housing 1 due to the valve 64 being closed, the fluctuation of the pressure in the housing 1 interior can be prevented.

Additionally, since the valve 64 provided at the inlet 63*a* of the second pooling container 63 reciprocatingly opens-closes the inlet 63*a*, even if powder from the powdery material falls from the first pooling container 62, operations will not be obstructed by such powdery material. Therefore, even when the inside of the second pooling container 63 varies between a decompressed state and an atmospheric pressure state, the molded articles 63 can reliably be pooled, and their disbursement can also be accomplished.

Next, the arrangements for wetdown, done after the compression molding finishes, will be described.

Figure 8:
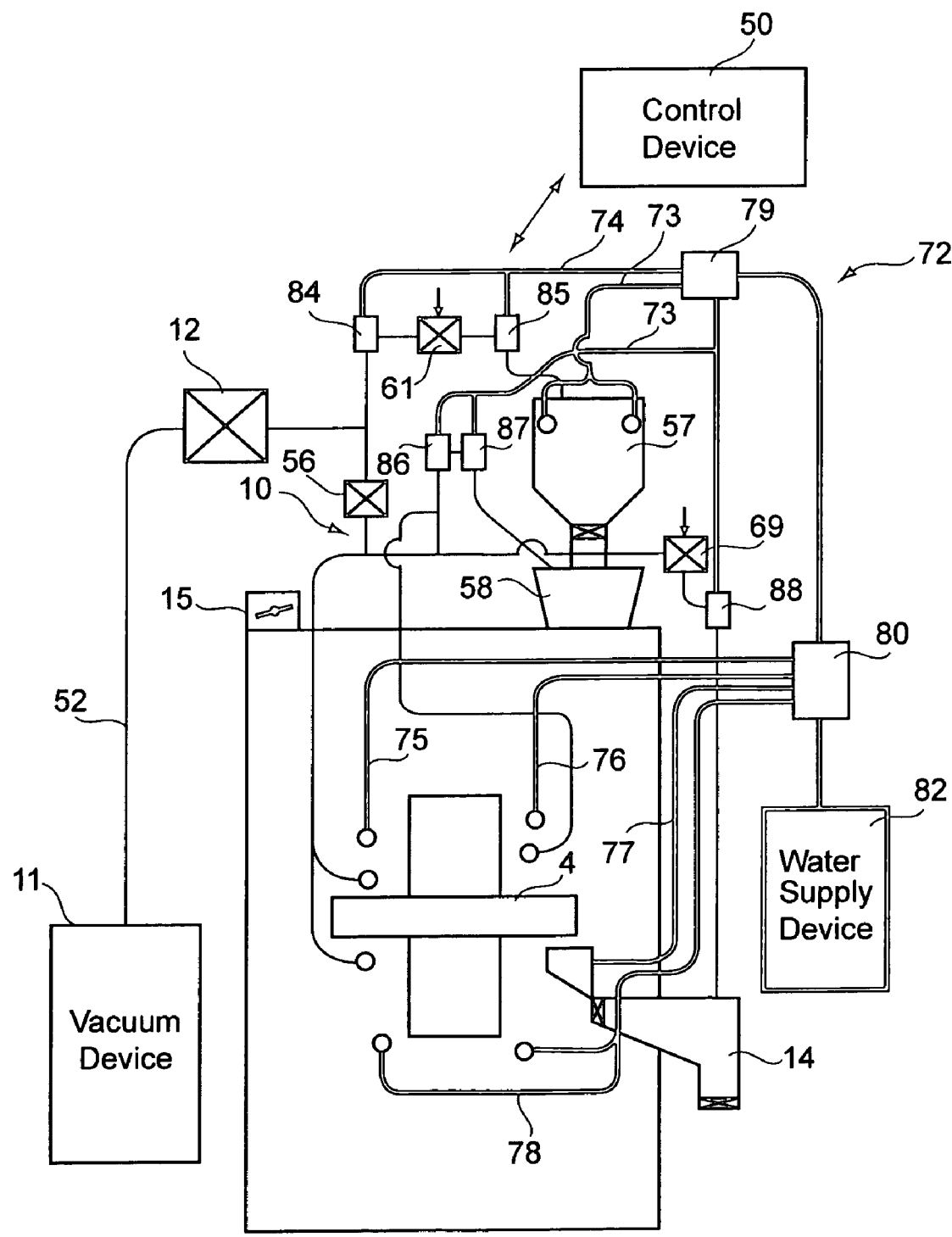
FIG. 8 A piping schematic drawing of the same showing the piping system for wetdown.

FIG. 8 shows the wetdown piping system 72, emphasized in bold lines, that was omitted from FIGS. 1-7.

This piping system 72 opens to the upper part of said hopper 57. It comprises a first wet pipe 73 for wetting the housing 1 interior via the powdery material supply mechanism 13 interior; a second wet pipe 74, respectively mounted at an intermediate part of said exhaust piping system 10, for wetting the housing 1 interior via this piping system 10 interior; a third wet pipe 75 with an opening at the interior of the tabletting area; a fourth wet pipe 76 with an opening at the forefront of the tabletting area; a fifth wet pipe 77 with an opening at the discharge mechanism 14; and a sixth wet pipe 78 with an opening at a lower part of the tabletting area. The first and second wet pipes 73, 74 connect through a first valve unit 79 to a water supply device shown as 82 in the drawing. The third—sixth wet pipes 75-78 connect through a second valve unit 80 to this water supply device 82.

The first and second valve units 79, 80 and the water supply device 82 are connected to said control device 50. More concretely, they are made so that the water supply is controlled so that the device is wetted from the top to the bottom of the device (wetdown). Further, the water supply device 82 is, more concretely, a pump and a heater not shown in the drawing. The cleaning process, to be described later, will also share this device.

Further, said second wet pipe 74 is, as shown in FIG. 8, is connected to wet pipe junction openings 84-88, arranged at intermediate parts of said exhaust piping system 10. These wet pipe junction openings 84-88 respectively also appear in FIGS. 2, 3 and 4, referenced by the same numbers. Furthermore, the illustration of said first-sixth wet pipes 73-78 have been omitted from FIGS. 2, 3 and 4.

Figure 9:
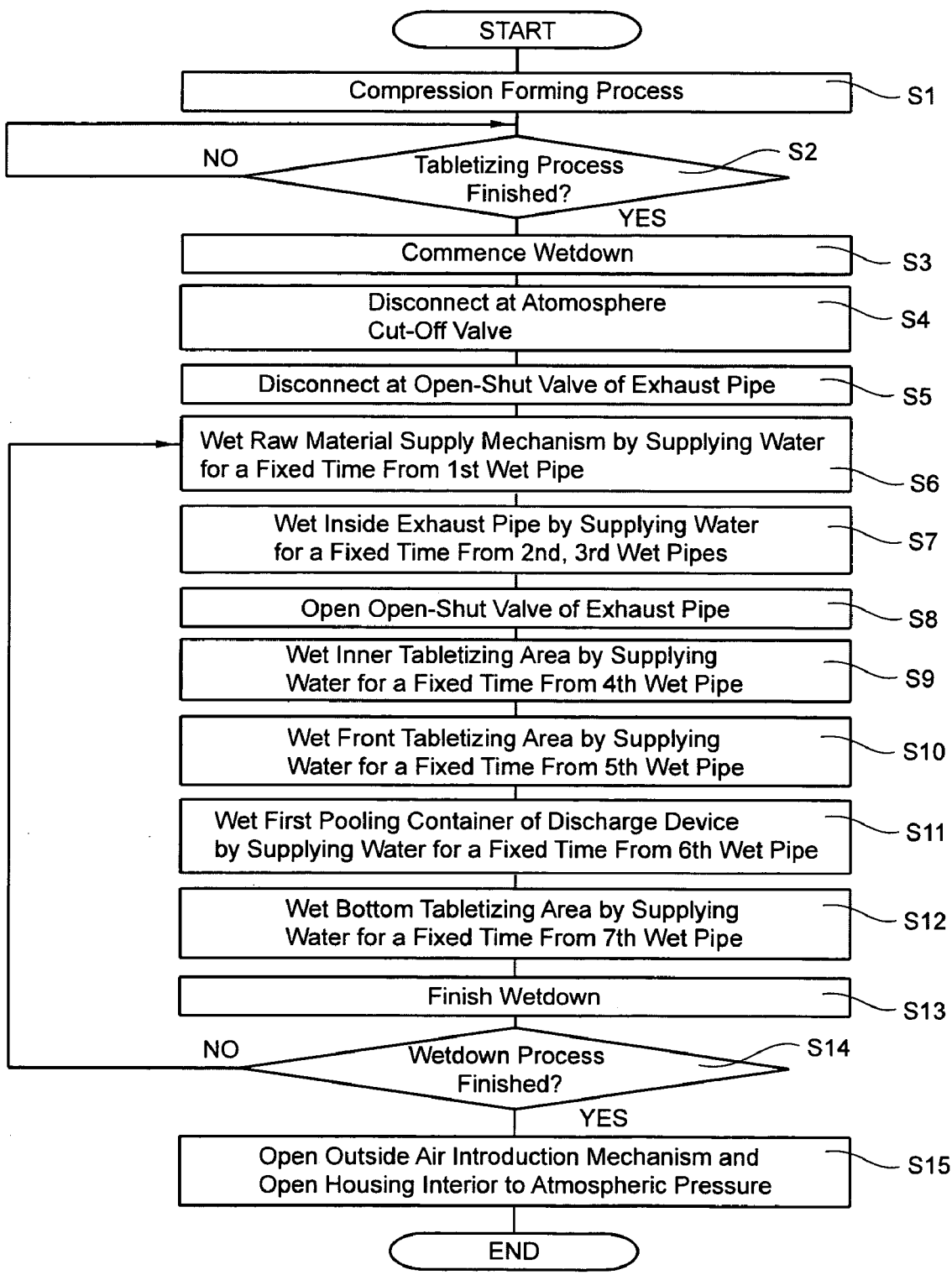
FIG. 9 A flow chart of the same showing the wetdown process.

FIG. 9 shows a flow chart of the wetdown process. Below, the device functions which operate based on the directions carried out by said control device 50 will be described based on this flow chart. Further, the following steps S1-S15 correspond with each reference character within that drawing.

This wetdown has the purpose of cleaning this device. It prevents the scattering of said powdery material when detaching parts and the like from the housing 1 interior, or when installing parts needed for cleaning. Its aim is to sufficiently wet the remaining powdery material before opening up to the outside atmosphere.

First, said control device 50 detects that the compression molding of said compression molding mechanism 2 has finished (steps S1, S2), and then goes on to carry out the following wetdown process (step S3). At first, a cut-off command is given to said atmosphere cut-off valve 12, and the atmospheres of the housing 1 side and the vacuum device 11 side are cut off (step S4). On the other hand, in order to sufficiently wet said exhaust piping system 10 interior (wetting down), the first open-shut valve 56 (shown in FIG. 7) is cut off (step S5).

Next, the control device 50 operates said water supply device 82. Along with that, it also controls said first and second valve units 79, 80, so that said first—sixth wet pipes 73-78 supply, in that order, the wetdown irrigation water to the housing 1 interior (steps S6-S12). With this process, the inside of this compression molding machine is wetted, beginning with the hopper 57 of said powdery material supply mechanism 13, in order from top to bottom (wetdown). In addition, because said first open-shut valve 56 is opened at intermediate step S8, the wetting irrigation water stored above this first open-shut valve 56 circulates in a downward direction toward the housing 1 side. With the above the wetdown process finishes (step S13). However, this process can be done more than twice. In this case, the above-mentioned steps S6-S13 are repeated until a prescribed number of times is reached (step S14). When it is determined that the entire wetdown process has been finished (YES at step S14), said outside air introduction mechanism 15 is opened and the housing 1 interior is opened up to atmospheric pressure (step S15).

Due to the above-mentioned description, processes from compression molding to wetdown can be executed without once opening up the housing interior. Due to this, when opening the housing 1, the residual powder will not scatter. Thus, it becomes possible to safely conduct the removal of inside parts and the like.

Next, the cleaning of this compression molding machine will be described.

Figure 10:
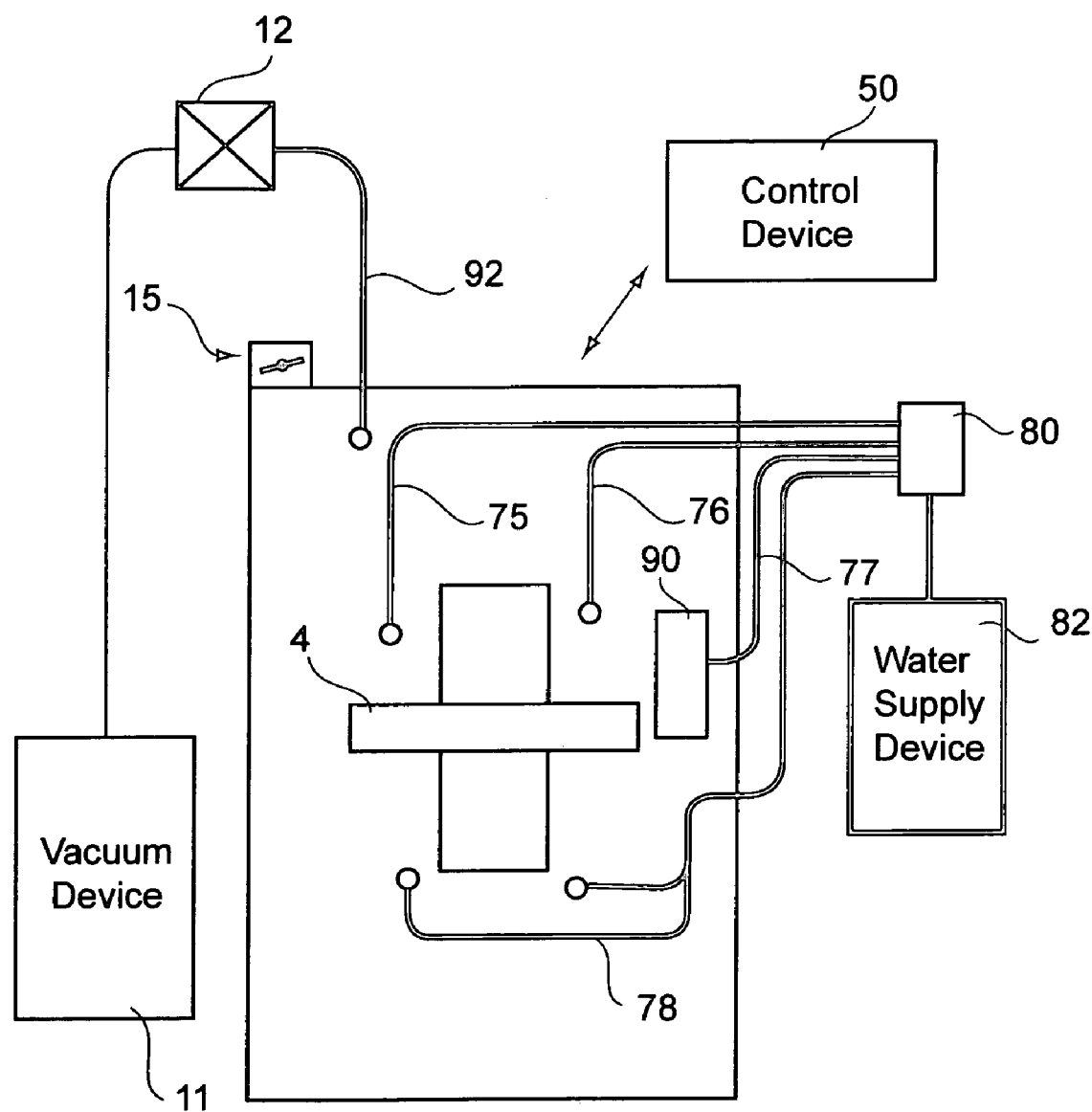
FIG. 10 A piping schematic drawing of the same showing the piping system for the cleaning and vacuum drying processes.

As mentioned above, the cleaning process is done with the parts necessary to get taken off from said compression molding machine taken off, or/and the parts needed to get installed being installed. In this embodiment, as shown in FIG. 10, other than said powdery material supply mechanism 13 and the molded article discharge mechanism 14, all of the exhaust piping system 10 at the housing side of said atmosphere cut-off valve 12, the first and second wet pipes 73, 74 and the first valve unit 79 are all removed. Then, a rotary table cleaning unit 90 is installed on the fifth wet pipe 77, in place of the molded article discharge mechanism 14. An exhaust pipe 92 for decompressed drying is installed to communicate from the housing 1 interior to said atmosphere cut-off valve 12.

Figure 11:
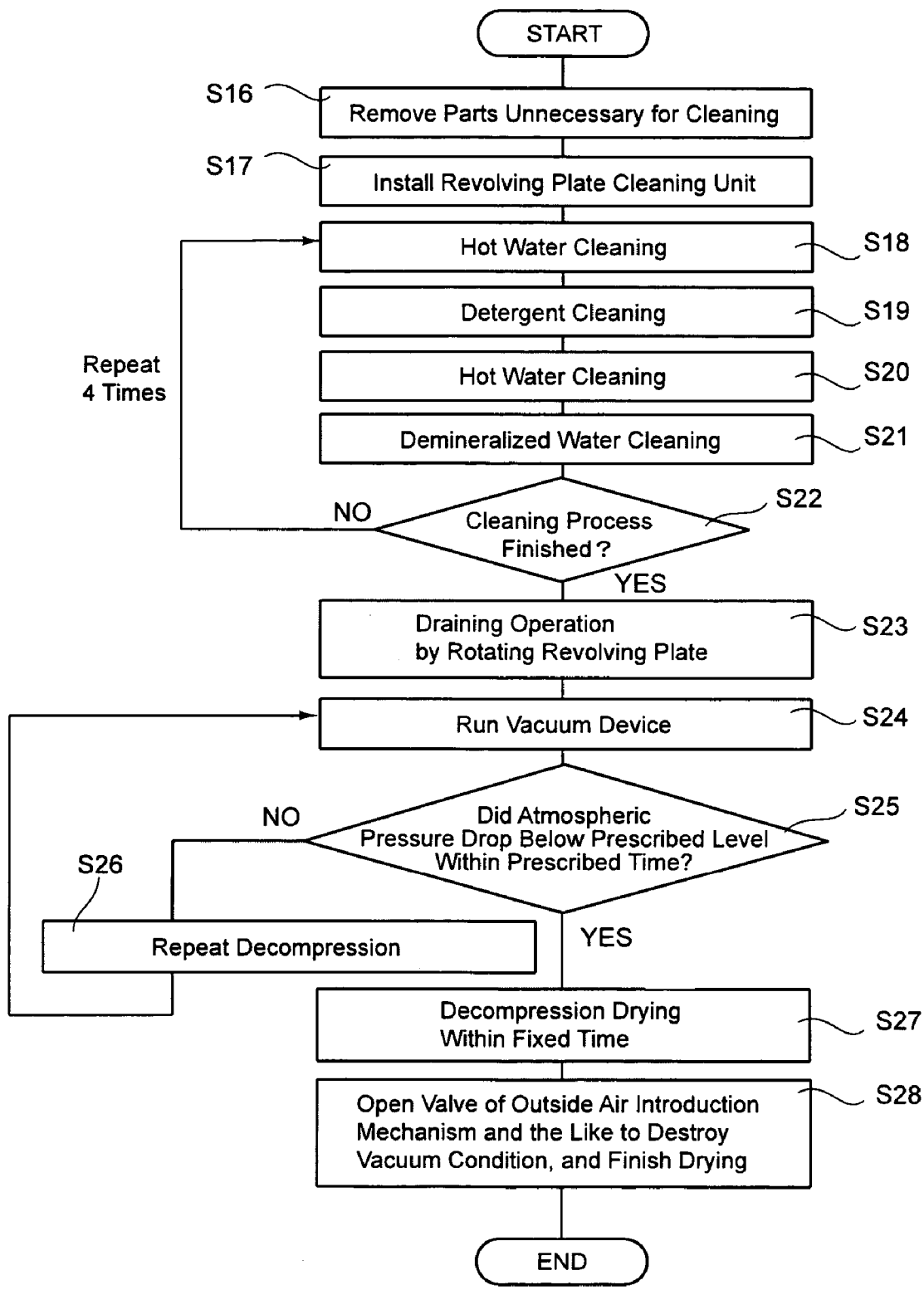
FIG. 11 A flow chart of the same showing the cleaning and vacuum drying processes.

FIG. 11 is a flow chart showing the processes from cleaning to decompressed drying.

At first, as mentioned above, parts that will not be cleaned within the housing are detached from the housing interior (step S16). In turn, the rotary table cleaning unit 90 is installed (step S17). Then, according to a command from said control device 50, the cleaning process begins. In this embodiment, the cleaning process comprises the 4 basic processes of a first hot water cleaning (step S18), a detergent cleaning (step S19), a second hot water cleaning (step S20), and a purified water cleaning (step S21). In each process, temperature adjusted irrigation water for cleaning is supplied via said third- sixth wet pipes 75-78. Additionally, said rotary table cleaning unit 90 is arranged and positioned for cleaning preponderantly the bore portions of the die bore 5$a$, holes for holder use and the like. It is for powerfully blowing the cleaning service water supplied via said fifth wet pipe 77 against the rotary table 4, and washing off the powdery stock and the like remaining there.

Until said control device 50 determines at step S22 that the cleaning process has finished, this cleaning process repeats 4 times, in this embodiment. If the cleaning process has finished, said control device 50 makes the rotary table 4 rotate and drains the water off (step S23).

With this compression molding machine, the decompressed drying of the machine interior is done consecutively (steps S24-S28). In this decompressed drying, while cutting off said outside air introduction mechanism 15, said atmosphere cut-off valve 12 is opened, and said vacuum device 11 is activated (step S24). Then, said control device 50 observes whether the pressure in said housing 1 interior has dropped below a prescribed atmospheric pressure within a prescribed time, by means of a pressure sensor that is not illustrated (step S25). In the case where the predetermined pressure drop within a predetermined time cannot be seen, this is proof that much moisture remains within the housing 1 interior. By repeating the decompression often (step S26), such moisture is gradually dried, and it becomes possible to achieve the predetermined pressure drop within the predetermined time. Once such a state is achieved, the state is maintained for a prescribed time period, and a complete drying is achieved (step S27). Then, lastly, the valves of the outside air introduction mechanism 15 and the like are opened up, and the vacuum state is opened up (step S28).

With such an arrangement, the required work for cleaning is conducted after the housing interior has been wetted once. Thus, when cleaning the housing interior, in cases where parts are taken out or, conversely, devices for cleaning use must be installed, the powdery material will not scatter during such work. It thereby becomes possible to safely conduct the work needed for cleaning.

One embodiment of the present invention has been described above, but the present invention is not limited to that. In the range where its main points are not changed, various modifications are possible.

For example, the powder compression molding mechanism 2 described in detail in the above-mentioned embodiment is just one example, and arrangements of molding mechanisms 2 other than that shown here can be used.

Additionally, the wetdown and cleaning in the above-mentioned embodiment share a common piping arrangement. However, separately provided piping systems may also be used.

Furthermore, in the above-mentioned embodiment, the atmosphere cut-off mechanism is an open-shut valve, but one need not be limited to such an arrangement, and others may also be possible. Also, the airtight regulation mechanism is an outside air introduction mechanism 15, but one need not be limited to that, and it can be a pump-type, as well.

What is claimed is:

1. A powder compression molding machine comprising:
 a housing for cutting off an inside from an outside atmosphere; a compression molding mechanism provided inside this housing for compression molding powdery material to a fixed form within this housing;
 a vacuum device connected to said housing through piping, for depressurizing the housing interior;
 an atmosphere cut-off mechanism for cutting off a piping interior atmosphere on said housing side from a piping interior atmosphere on the vacuum device side; and a liquid supply mechanism for wetting said compression molding mechanism and powdery material stuck to the inside of said housing, within the atmosphere of the housing side starting from said atmosphere cut-off mechanism.

2. The apparatus of claim 1, further comprising
a cleaning mechanism, installed within said housing after opening up a depressurized state of said housing interior, for cleaning said compression molding mechanism within said housing and the inside of said housing.

3. The powder compression molding machine of claim 1, further comprising
a control device, connected at least to said compression molding mechanism, the atmosphere cut-off mechanism, and the liquid supply mechanism, wherein, after the compression molding by said compression molding mechanism finishes, this control device operates said atmosphere cut-off mechanism to cut-off the piping interior atmosphere of the housing side from the piping interior atmosphere of the vacuum device side, and then, in order to wet said compression molding mechanism and the powdery material stuck to the inside of said housing by using said liquid supply mechanism, said control device controls each mechanism.

4. The powder compression molding machine of claim 1, further comprising an airtight regulation mechanism for adjusting an atmospheric pressure within the housing interior.

5. The powder compression molding machine of claim 4, wherein the airtight regulation mechanism is installed on said housing.

6. The apparatus of claim 1,
wherein said control device is also connected to said airtight regulation mechanism, and after wetting the powdery material by way of said liquid supply mechanism, said control device opens up the depressurized state of said housing.

7. The apparatus of claim 6,
wherein, after cleaning said powdery material in the state where the depressurized state of the housing is opened up by way of said airtight regulation mechanism, said control device closes said airtight regulation mechanism and operates the vacuum device, while also opening said atmosphere cut-off mechanism, and causes said housing interior to decompress dry.

8. The apparatus of claim 1, further comprising
a powdery material supply mechanism provided on said housing for temporarily accepting the powdery material supplied at said housing interior, wherein this powdery material supply mechanism is connected to the piping on said housing side going from said atmosphere cut-off mechanism, and when the powdery material is accepted within the powdery material supply mechanism from outside the housing, the inside pressure of the powdery material supply mechanism is kept at atmospheric pressure, and when the powdery material is supplied from the inside of the powdery material supply mechanism to the housing interior, the inside pressure of said powdery material supply mechanism is depressurized.

9. The apparatus of claim 1, further comprising
a molded article discharge mechanism provided on said housing, for temporarily receiving molded articles that were compression molded within said housing and disbursed to the outside of the housing, wherein this molded article discharge mechanism is connected to the piping on the housing side going from said atmosphere cut-off mechanism, and when said molded articles are taken into said molded article discharge mechanism interior the molded article discharge mechanism interior is depressurized, and when the molded articles are disbursed to the outside of the molded article discharge mechanism, the molded article discharge mechanism interior is kept at atmospheric pressure.

10. The apparatus of claim 9,
wherein the discharge mechanism is provided with a derivation line which opens to a particular site in the housing interior and derives its atmosphere.

11. The apparatus of claim 10,
wherein the particular site is at least in the upper surface vicinity of a rotary table.

12. The apparatus of claim 9,
wherein the depressurized state of the powdery material supply mechanism and the molded article discharge mechanism at least roughly equals the depressurized state of the housing interior.

13. The apparatus of claim 9, further comprising
an outside air introduction unit provided at an upper part of the housing and provided with an adjusting device for adjusting an amount of outside air introduced.

14. The apparatus of claim 9,
wherein the powdery material supply mechanism communicates with a hopper for pooling the powdery material when the hopper has a depressurized state, to arrange a prescribed amount of the powdery material above a rotary table.

15. The apparatus of claim 9,
wherein the molded article discharge mechanism is provided with a first pooling container for pooling under decompression molded articles discharged from a die, a second pooling container for discharging under atmospheric pressure molded articles supplied from the first pooling container, and a valve for selectively, through reciprocation, communicating the first pooling container with the second pooling container.

16. A method of molding molded articles by using a powder compression molding machine, having a housing for cutting off the inside from the outside atmosphere and a compression molding mechanism provided in the housing interior for compression molding, within the housing interior, powdery material into a prescribed form, comprising:
a step of depressurizing the housing interior using a vacuum device connected to said housing via an atmosphere cut-off mechanism;
a step of supplying powdery material into said housing interior;
a step of compression molding said powdery material to a prescribed form using the compression molding mechanism provided within the housing interior;
a step of cutting off a piping interior atmosphere on the housing side going from said atmosphere cut-off mechanism, from a piping interior atmosphere on the vacuum device side, after said compression molding is finished;
a step of wetting said compression molding mechanism and powdery material stuck to the inside of said housing, within the atmosphere of the housing side starting from said atmosphere cut-off mechanism; and
a step of opening up the depressurized state of said housing interior.

17. The method of claim 16, further comprising
a cleaning step of cleaning, within said housing interior, said compression molding mechanism and powdery material stuck to the inside of said housing, after opening up the depressurized state of said housing interior.

18. The method of claim 17, further comprising a step of, after washing said powdery material, closing an outside air introduction mechanism and operating the vacuum device, while also opening said atmosphere cut-off mechanism and decompression drying said housing interior.

19. The method of claim 16, wherein in the step of supplying said powdery material is performed via a powdery material supply mechanism provided on said housing for temporarily accepting the powdery material, and when the powdery material is accepted within the powdery material supply mechanism from outside the housing, the inside pressure of the powdery material supply mechanism is kept at atmospheric pressure, and when the powdery material is supplied from the inside of the powdery material supply mechanism to the housing interior, the inside pressure of said powdery material supply mechanism is depressurized.

20. The method of claim 19, further comprising a step of disbursing the molded articles compression molded within said housing interior to the outside of the housing, wherein in this process, when said molded articles are taken into said molded article discharge mechanism interior the molded article discharge mechanism interior is depressurized, and when the molded articles are disbursed to the outside of the molded article discharge mechanism, the molded article discharge mechanism interior is kept at atmospheric pressure.

* * * * *